(12) United States Patent
Kluttz et al.

(10) Patent No.: US 7,191,407 B1
(45) Date of Patent: Mar. 13, 2007

(54) METHOD AND APPARATUS FOR LEARNING COMPUTER INTERFACE ATTRIBUTES

(75) Inventors: Karen R. Kluttz, Raleigh, NC (US); Sandeep K. Singhal, Raleigh, NC (US); Thyra Rauch, Raleigh, NC (US); David A. Schell, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 796 days.

(21) Appl. No.: 09/614,852

(22) Filed: Jul. 12, 2000

(51) Int. Cl.
*G06F 3/00* (2006.01)
*G06F 15/00* (2006.01)

(52) U.S. Cl. ............. 715/788; 715/516; 715/523; 715/759; 715/798

(58) Field of Classification Search .......... 345/206, 345/744, 747, 760, 798, 800, 801, 807, 809; 709/206; 715/516, 523, 759, 815, 838
See application file for complete search history.

(56) References Cited

U.S. PATENT DOCUMENTS

| | | | | |
|---|---|---|---|---|
| 5,613,134 A * | 3/1997 | Lucus et al. | ............. | 345/733 |
| 5,634,064 A | 5/1997 | Warnock et al. | ............. | 395/774 |
| 5,675,752 A * | 10/1997 | Scott et al. | ............. | 345/866 |
| 5,699,535 A | 12/1997 | Amro | ............. | 395/342 |
| 5,712,995 A * | 1/1998 | Cohn | ............. | 345/792 |
| 5,760,772 A | 6/1998 | Austin | ............. | 345/342 |
| 5,794,001 A | 8/1998 | Malone et al. | ............. | 395/342 |
| 5,805,118 A * | 9/1998 | Mishra et al. | ............. | 345/1.1 |
| 5,825,360 A * | 10/1998 | Odam et al. | ............. | 345/807 |
| 5,838,318 A | 11/1998 | Porter et al. | ............. | 345/342 |
| 5,847,706 A | 12/1998 | Kingsley | ............. | 345/342 |
| 5,929,854 A | 7/1999 | Ross | ............. | 345/342 |
| 5,973,692 A * | 10/1999 | Knowlton et al. | ............. | 345/835 |
| 5,990,889 A | 11/1999 | Amro | ............. | 345/342 |
| 6,005,570 A | 12/1999 | Gayraud et al. | ............. | 345/338 |
| 6,008,809 A * | 12/1999 | Brooks | ............. | 345/792 |

OTHER PUBLICATIONS

Rosen et al., UNIX System V Release 4: An Introduction, 1996, American Telephone and Telegraph Company Publisher, 2nd Edition, pp. 59-61.*

* cited by examiner

*Primary Examiner*—Ba Huynh
*Assistant Examiner*—Truc T. Chuong
(74) *Attorney, Agent, or Firm*—Synnestvedt & Lechner LLP

(57) ABSTRACT

The invention is a method and apparatus for automatically opening files of particular types in a computer application program using certain attributes, such as window size and position, as dictated by user preferences based on the user's previous habits in opening files of the same type in that particular computer application program or based on properties of the file itself.

29 Claims, 4 Drawing Sheets

METHOD AND APPARATUS FOR LEARNING COMPUTER INTERFACE ATTRIBUTES

FIELD OF THE INVENTION

The invention pertains to operator interfaces for computer displays. More particularly, the invention pertains to a method and apparatus for automatically storing and recalling computer file display preferences.

BACKGROUND OF THE INVENTION

Frequently, workers in offices spend significant amounts of time using computers. Many of the tasks performed by such workers are repetitive. As merely an example, let us consider a data entry clerk for a financial institution, such as a bank. One aspect of this individual's responsibilities includes transferring information from one computer file to another. For example, let us consider a bank in which information about its customers had previously been stored in signature cards which have now been scanned and stored as image files in a computer database. Such information might include the customer's name, address, social security number, mother's maiden name, and a copy of the customer's signature.

As part of a scheme to automate customer banking, the bank has scanned all of its signature cards into a computer and converted them into .gif format (Graphic Interface File) files. Each signature card has been converted into two image files representing the front and the back of each card, respectively. The front image file is named #name.gif and the back image file is named #name.back.gif, wherein "#name" represents the customer's actual name. It is the data entry clerk's responsibility to open up each of these .gif files and manually type in data from those signature cards into a database using a database application program. Accordingly, for each customer, the data entry clerk (1) opens the .gif file corresponding to the front of the signature card, (2) opens the file corresponding to the back of the same signature card, (3) sizes the windows displaying the two files so as to take up the top left hand quadrant of the screen and the bottom left hand quadrant of the screen, respectively, (4) opens up another window which provides a GUI (Graphical User Interface) in which the data entry clerk can type in information from the two aforementioned .gif files, (5) sizes and positions that window to take up the right-hand half of the screen, and (6) enters the data shown in the signature card files displayed in the left hand half of his computer screen into the GUI which is on the right hand half of the screen. These steps must be repeated for every customer.

It is well known in the prior art to provide a operator interface program that automatically sizes application program windows based on operator preferences. For instance, most software packages, such as those that run under the Microsoft™ Windows operating system, have the ability to size and position themselves in windows that are the same size and position that the programs had been when they were last closed. For example, if the last time a computer operator opened a particular word processing application program on a particular computer, the user interface window for that program was positioned and sized in a particular manner, the next time the program is opened, it opens up in a window of the same size and position. This particular feature is also used with respect to other windows within that program. Thus, for instance, if the last time a user closed a sub-window, such as a sub-window for selecting a file to be opened, that window was sized to one quarter the total screen size and positioned in the upper right hand corner, the next time the user selects to open a pre-existing file, the corresponding sub-window appears with the same size and position. If the user resizes or repositions the sub-window before closing it, the operating system software remembers the latest size and position. The next time that particular sub-window is opened, it will be opened with the latest size and position. However, documents (i.e., computer files) that are opened within the application program are opened to a standard size each time.

Accordingly, it is an object of the present invention to provide an improved operator interface for a computer display.

It is a further object of the present invention to provide a method and apparatus for automatically assigning desirable display attributes to files opened with an application program.

It is yet another object of the present invention to provide a method and apparatus for automatically opening files of particular types having desirable display attributes particular to that type.

It is one further object of the present invention to provide a method and apparatus for automatically opening files of particular types having desirable display attributes as dictated by the operator's preferences.

SUMMARY OF THE INVENTION

In accordance with the present invention, a feature is provided in which the application program stores information about certain operator display preferences for particular file types used in that application and then automatically applies those preferences whenever files of the same type are opened. Thus, in accordance with the invention, display attributes that can be set by the operator, such as window size, window position, font, and color, are stored in a table associated with the particular file type. Whenever a file of the same type is opened, it is assigned the same values for those attributes. The file type may be given by one or more extensions in the file name, such as .gif, .tif, .doc, .wpd. The invention can be expanded to include automatically opening a second file of a related type whenever a file of the first type is opened and sizing, positioning and assigning it even further attributes as dictated by the operator's preference.

In accordance with the invention, the operator may be given the option to manually set the attributes for a given file type. Alternately, the existing attribute values at the time when a file is closed may be automatically assigned to the next file of the name type that is opened.

DETAILED DESCRIPTION OF THE INVENTION

Figure 1:
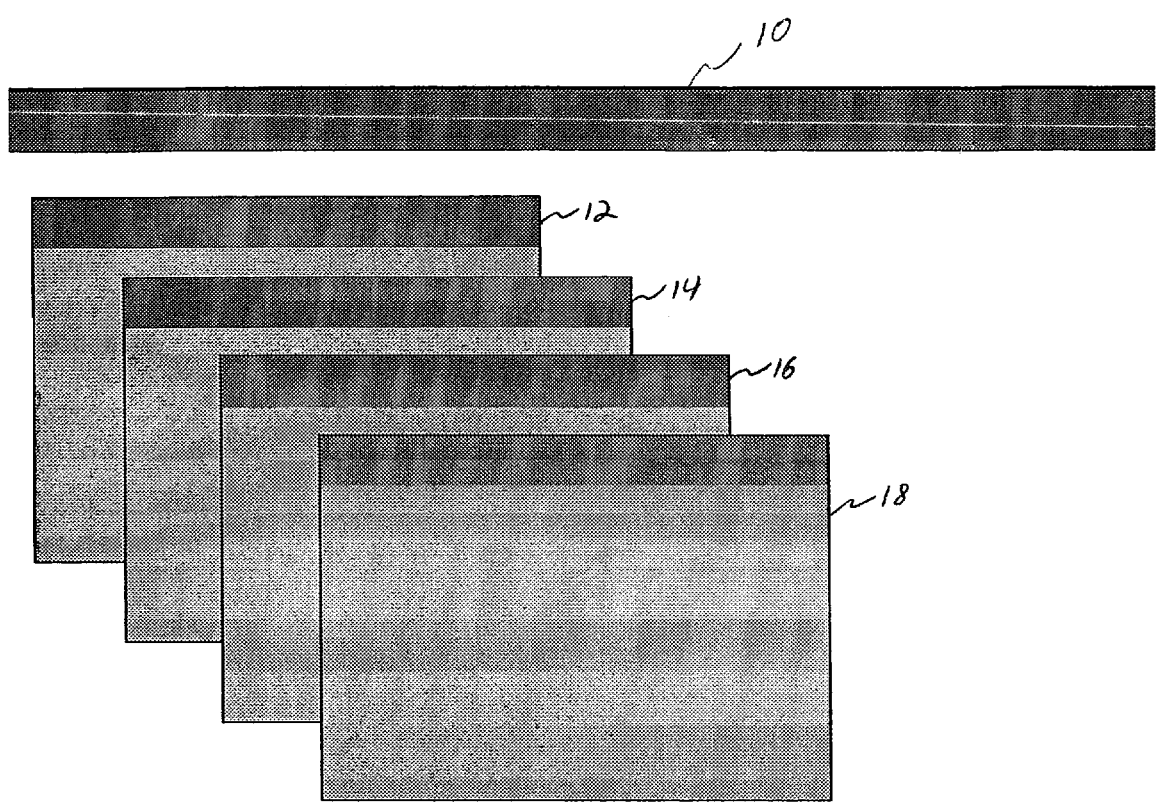
FIG. 1 is a pictorial view of an exemplary computer screen display having a first set of display attributes.

FIG. 1 is a copy of an exemplary computer display screen 10 in which an operator of the computer has opened an application program and several documents 12, 14, 16, 18 within that program in accordance with the prior art. Particularly, the program has opened into a window which consumes the entire display screen. Within the program, the operator has opened up an image file 12 named johnsmith-.gif. It is an image of the front of a signature card of an individual named, John Smith. The operator also has opened up a second file 14 which is the back of the signature card. This file is named johnsmith.back.gif.

In accordance with the protocol of the bank for which the operator works, signature card images are assigned file names as follows: the front of each signature card is named #customername.gif, and the back of each signature card is named #customername.back.gif, where "customername" is the actual name of the customer. Accordingly, it is known that the file corresponding to the back of the signature card whose front is stored as johnsmith.gif is named johnsmith-.back.gif.

Figure 2:
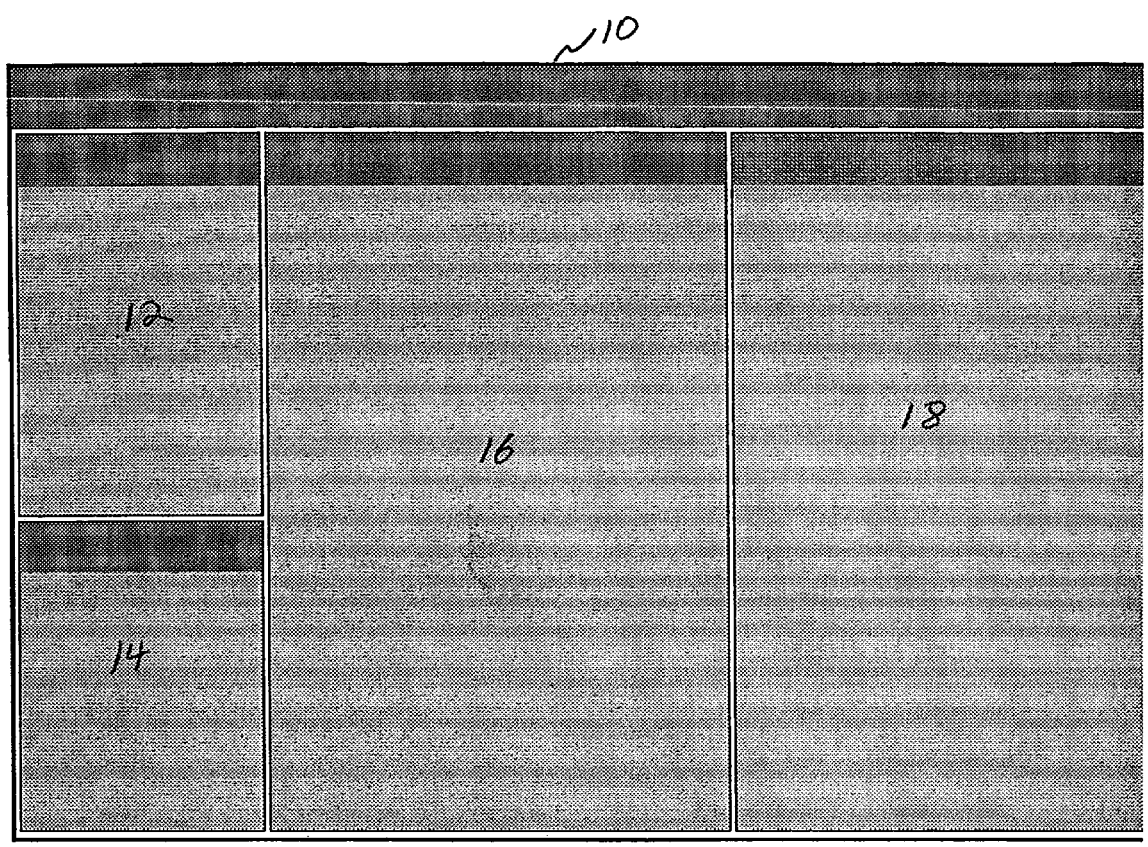
FIG. 2 is a pictorial view of an exemplary computer screen display having a second set of display attributes.

The operator also has opened up third and fourth files 16, 18 in which he or she will enter data. In FIG. 1, the operator has merely opened the files in accordance with the application program, but has not yet resized or repositioned the windows or changed any other attributes of the display of the files. Accordingly, FIG. 1 shows the computer screen condition after opening these four files as set by the default conditions of the application program. The operator then manipulates each of the four windows to size and position them in a convenient manner for the task that he or she is to perform. Thus, for instance, the user may manipulate the four windows to the positions and sizes shown in FIG. 2. The manner of manipulating windows to resize and reposition them is well known to those in the art and involves much manipulation with one's mouse and is time consuming.

In the present example, as in many real-life workplaces, the computer operator must repeat the same operations with respect to the same types of files all day long. Specifically, for each customer signature card, the operator opens three windows and repositions and resizes them from the original default conditions as shown in FIG. 1 to the desirable conditions shown in FIG. 2.

In accordance with the present invention, the application program is provided with software which "observes" each file that the user opens, records one or more of the display attributes of that file as set by the user and then applies those attributes each time a file of the same type is opened. This feature is herein termed attribute coercion.

A table is maintained in memory in which each of the display attributes, such as window position and window size, are stored in association with the file type. The table may be stored in a RAM memory or a persistent memory device such as a tape or a disk. The file type can be indicated in many forms, including, but not limited to, the extension or extensions of the file name, such as .gif and .back.gif. In one preferred embodiment, a table is maintained in memory in which an entry for each particular file type is updated every time an operator closes a file of that given type.

Particularly, when an operator closes a file of a particular type, the display attributes applied to that file at the time it is closed are stored to the table.

The operator should have the option of disabling the attribute coercion feature on a per-instance basis as well as generally. In addition, in a preferred embodiment, the feature can be selectively disabled with respect to particular file types.

Even further, while it is envisioned that the invention is incorporated as part of the application program or programs with which it will be used, it also can be provided as a separate software package that can operate generally with some or all of the other application programs loaded on the same computer.

Below is an exemplary algorithm in accordance with the present invention.

The inventive software program creates a master attributes file when it is installed.

Whenever a file is closed, an entry is placed in the master attributes file. The entry would include the extension or extensions of the file and the attributes of interest. In this example, the attribute of interest will be screen size. However, it should be understood that any attribute and any number of attributes can be stored associated with the file type. For example, after closing acme.aoi.gif, the following entry is added to the table:
.aoi.gif size 850×525

Where 850×525 is the window size of aoi.gif at the time it was closed. This entry indicates that all files bearing the extensions .aoi.gif should be opened in a window of size 850 pixels×525 pixels.

Similarly, after closing smith.sig.gif, the following entry is added to the master attributes file:
.sig.gif size 50×75

When a file is opened, the program searches for an entry in the table for the same extension or extensions of the file that is being opened. If one is located, the file is opened at the size indicated in the table.

The operator may disable attribute coercion for particular document types. For example, the user may be provided with a menu option for disabling attribute coercion by file type. For instance, if the operator disables attribute coercion for .sig.gif files, the following entry is added in the master attributes table:
.sig.gif *

This designation is never overwritten by the application unless the user removes the restriction.

Additional attributes may be associated with each document type. For example, if a document type should be characterized by multiple views, the following entry may be placed in the table:

| .sig.gif | size | 50 × 75 | |
| .sig.gif | related | #N.back.gif | size 50 × 75 |

This implies that, whenever a file of type .sig.gif is opened, it should be placed into a window of size 50×75. Moreover, the second line indicates that whenever a file bearing the .sig.gif extension is opened, a second file bearing the same name, but having the extension .back.gif should be opened with size 50×75. Thus, when the user indicates to open smith.sig.gif, the software opens both smith.sig.gif and smith.back.gif.

Other attributes besides window size which may be most useful to store in the master attributes table include window position, window color, editing mode, and default font.

In accordance with another aspect of the invention, rather than relying on stored information about the file type, display attributes to be applied to a file can be automatically selected based on data available within the file itself. For instance, with respect to HTML documents, it may be desirable to open the documents with a size that is customized based on the number of lines in the HTML file. Thus, for example, software in accordance with the invention may count the number of lines in a file during the process of opening the file and then automatically size the window in which it opens to the minimum size which allows all of the lines to be displayed at once. If the number of lines exceeds the full size of the screen, the window is simply opened at its largest possible size. Preferably, it also displays the number of lines which are not in the viewing area when the number of lines is greater than can be shown in the available screen area.

This feature also may be extended to drop down boxes, including drop down menus. Specifically, a drop down box typically displays x number of elements, when x is an integer. So if the list in the drop down box contains x+1 elements, the user is forced to scroll to see that last element. However, the invention can be adapted to determine the number of lines in the box and size the drop down box to a size which will display all of the elements in that box. This feature can be applied to drop down menus in application programs and to drop down boxes in Web pages.

Even further, the invention can be used in connection with a list box, such as an HTML list box, that displays a list of elements.

The invention provides for easy manipulation of a program interface. A software package in accordance with the present invention may provide a properties sheet window in which the operator can customize operation of the invention by setting such parameters as (1) file types for which the auto attribute coercion is disabled, (2) file types for which the assigned attributes are manually set by the operator and not further modified except by the operator manually and the set of attributes that will and will not be coerced, (3) the set of attributes that will and will not be assigned by file type, and (4) when the attributes will be assigned (eg, when the file is closed automatically or when the operator manually chooses, such as by a clicking a tool bar button).

The invention would be particularly useful in connection with programs that are typically used with a limited number of file types and for which the users of the program commonly perform repetitive tasks with different files of the same type.

In the examples used herein, the file type is based on the file name extension or extensions. Thus, in these examples, anything after the first period in the file name is considered an extension and can be used to designate file type. It should be understood by those of skill in the art that other means for identifying files by type can be implemented in accordance with the invention. For example, rather than file name extension, the program might use attribute information contained within the file itself in a known location. Thus, when the file is being opened, these attributes can be read from the designated location and used to determine file type.

Figure 3:
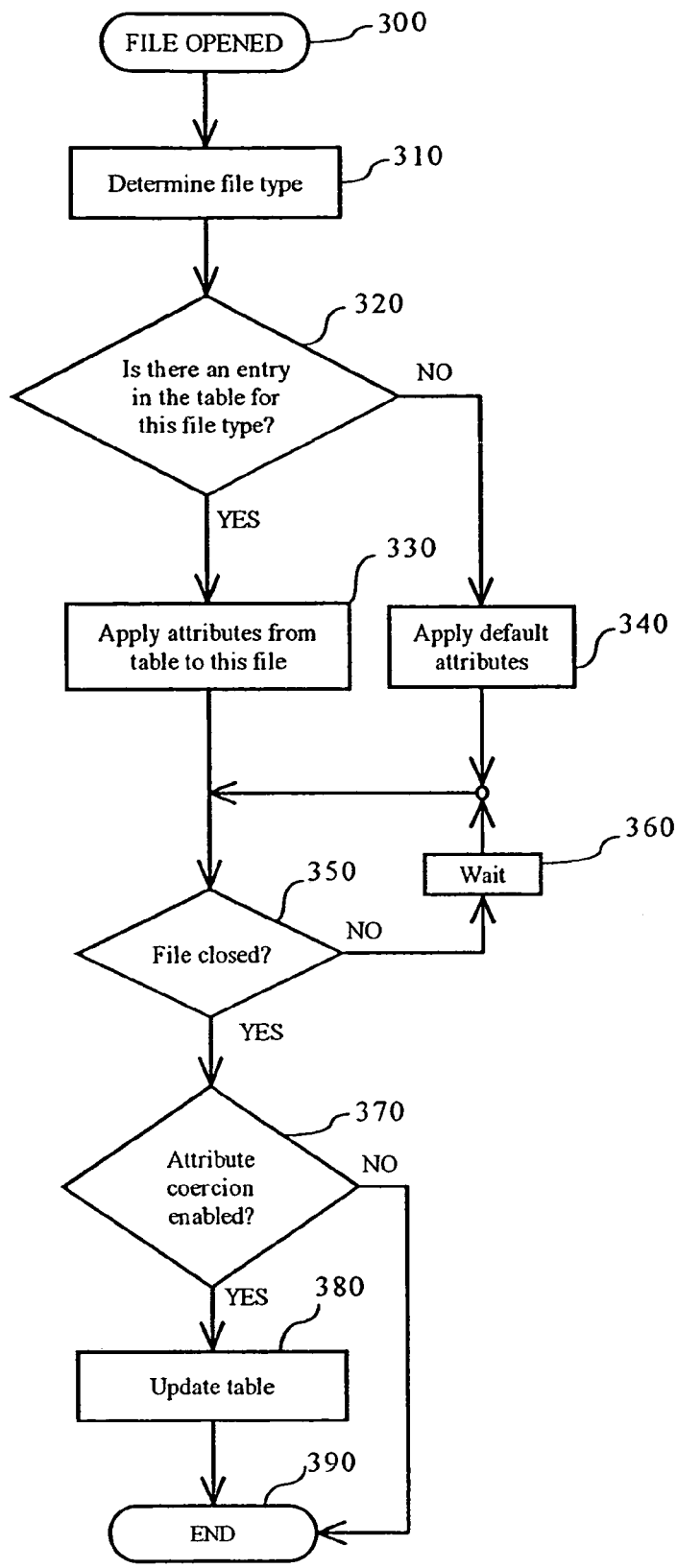
FIG. 3 is a flow chart illustrating operation in accordance with one particular embodiment of the present invention.

FIG. 3 is a flow chart illustrating operation of the invention in accordance with a first particular embodiment. It should be understood that this flow chart represents merely an exemplary embodiment and that many modifications are possible, including some of those modifications discussed above.

The process begins when a file is opened in step 300. In step 310, the program determines the file type, such as by observing the extension or extensions in the file name. In step 320, it is determined whether there is an entry in the table for this file type. If not, flow proceeds to step 340 where the default attributes of the application program with which the invention is being utilized are applied. However, if there is an entry in the table, flow instead proceeds to step 330 where the attributes assigned to that file type in the table are used for opening this file.

In step 350, it is determined whether the operator has closed the file. If not, flow proceeds to step 360 to wait for the file to be closed. It should be understood by those of skill in the art, that step 350 and 360 are merely exemplary and that, in other embodiments, the file closing event might be indicated by an interrupt rather than by continuously looping through steps 350 and 360.

When the file is eventually closed, in step 370, it is determined whether the attribute coercion feature is enabled. If not, flow proceeds directly to the end at step 390. However, if it is enabled, flow proceeds to step 380 where the table is updated with the values of the specific attributes that exist at that time.

Figure 4:
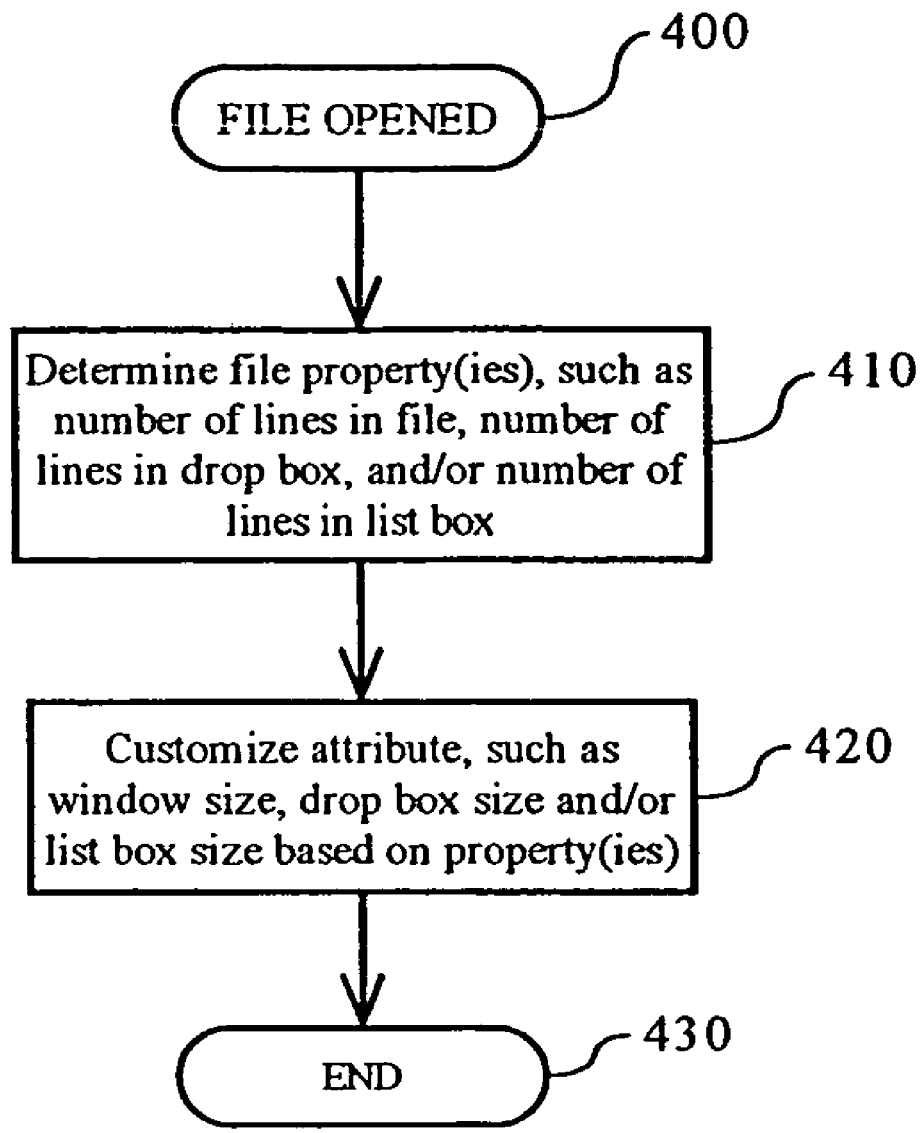
FIG. 4 is a flow chart illustrating operation in accordance with another particular embodiment of the present invention.

FIG. 4 illustrates operation of the invention in accordance with a second embodiment. The process begins at step 400 when a file is opened. In step 410, the file properties of interests, such as the number of lines in the file, the number of lines in one or more drop boxes in the file, and/or the number of lines in one or more list boxes in the file are determined. This can be accomplished by examining the source code for the file.

In step 420, the relevant attributes, such as window size, drop box size and/or list box size are customized based on the pertinent line count. The window size in which a file will be opened is dictated by the application program which is being used to open the file. Therefore, the inventive method and apparatus is applied within the application program with which it is being used without the need to modify the file that is being opened. However, with respect to display attributes that are normally dictated by the contents of the file itself such the size of a drop box or list box within an HTML document, the actual file must be modified in order to effect the present invention. In at least one preferred embodiment, the customization step comprises revising the source code within the file as it is stored in RAM for execution. OF course, preferably, no change is made to the original copy of the file. The process ends in step 430.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

I claim:

1. A method of providing an interface with displayable computer files on a computer display, said method comprising the steps of:
    (1) displaying a first displayable file on said computer display in a manner customized by an operator of said computer;
    (2) storing data indicating a value of at least one attribute of the manner in which said first file was displayed associated with data indicating a type of said first file;
    (3) when another file of the type of said first file is opened by an operator for display, accessing said stored data indicating said value of said at least one attribute; and
    (4) displaying said another file of the type of said first file using said stored value of said at least one attribute.

2. The method of claim 1 wherein step (2) comprises storing said value when said first file is closed by said operator.

3. The method of claim 2 wherein said value that is stored in step (2) is the value of said attribute when said first file was closed.

4. The method of claim 1 wherein the value that is stored in step (2) is the value of said attribute at a time selected by said operator.

5. The method of claim 1 wherein said attribute is a size of a window within which said first file was displayed.

6. The method of claim 5 wherein said attribute further comprises a position of said window within said computer display.

7. The method of claim 1 wherein said attribute further comprises a position of said window within said computer display.

8. The method of claim 1 wherein said file type comprises a file name extension of said first file.

9. The method of claim 8 wherein said extension comprises multiple extensions.

10. The method of claim 8 wherein step (3) comprises reading said table to determine said attribute.

11. The method of claim 1 wherein said storing step comprises storing said data as an attribute table comprising a plurality of data entries relating file types to attribute values.

12. The method of claim 1 further comprising the steps of:
   (4) displaying a second displayable file simultaneously with said first file on said computer display in a manner selected by said operator;
   (5) storing data associated with said type of said first file indicating at least a type of said second file relative to said first file; and
   (6) when another file of the type of said first file is opened for display, automatically opening another file of the same type as said second file having the same relationship to said another file of said first type as said second file had to said first file.

13. The method of claim 12 wherein step (5) comprises storing said type of said second file when said first file is closed by said operator.

14. The method of claim 13 further comprising the steps of:
   (7) storing data indicating a value of at least one attribute of said second file, said data associated with said type of said second file and with said type of said first file; and
   (8) when said another file of the same type as said first file is opened by an operator, assigning said another file of the same type as said second file the same value for said attribute of said second file.

15. The method of claim 14 wherein step (7) comprises storing said value when said first file is closed by said operator.

16. The method of claim 15 wherein said value that is stored in step (7) is the value of said attribute when said first file was closed.

17. The method of claim 12 wherein the value that is stored in step (7) is the value of said attribute at a time selected by said operator.

18. The method of claim 14 wherein said attribute of said second file comprises a size of a window within which said second file was displayed.

19. The method of claim 18 wherein said attribute of said second file further comprises a position of said window.

20. The method of claim 14 wherein said attribute of said second file further comprises a position of said window.

21. A computer readable product stored on computer readable medium executable by a computing device for providing an interface with displayable computer files on a computer display, said computer product comprising:
   (1) computer executable instructions for determining a value of at least one display attribute of a first displayable file on a computer;
   (2) computer executable instructions for determining a type of said first file;
   (3) computer executable instructions for automatically storing said value associated with data indicating said type of said first file when said first file is closed;
   (4) computer executable instructions for accessing said stored value when another file of said same type as said first file is opened; and
   (5) computer executable instructions for using the same value to display said another file.

22. The computer readable product of claim 21 wherein said computer executable instructions for storing comprises computer executable instructions for storing said value of said attribute when said first file was closed.

23. The computer readable product of claim 22 wherein said file type comprises a file name extension of said first file.

24. The computer readable product of claim 21 wherein said computer executable instructions for storing comprises computer executable instructions for storing said data as an attribute table comprising a plurality of data entries relating file types to attribute values.

25. The computer readable product of claim 21 further comprising:
   computer executable instructions for determining a value of at least one display attribute of a second displayable file on a computer that is displayed simultaneously with said first file;
   computer executable instructions for determining a type of said second file;
   computer executable instructions for storing data associated with said type of said first file indicating at least said type of said second file relative to said first file and said at least one attribute of said second file; and
   computer executable instructions for automatically opening, when another file of said type of said first file is opened for display, another file of the same type as said second file having the same relationship to said another file of said first type as said second file had to said first file.

26. The computer program readable product of claim 25 wherein said relationship comprises said first and second files having file names with identical first portions.

27. The computer program readable product of claim 26 wherein said file names each comprise a first part and an extension part and wherein said file types are dictated by said extension part and said first part comprises said first portion.

28. The computer readable product of claim 25 wherein said relationship comprises said first and second files having file names with identical first portions.

29. The computer readable product of claim 28 wherein said file memos each comprise a first part and an extension part and wherein said file types are dictated by said extension part and said first part comprises said first portion.

* * * * *